United States Patent
Davies et al.

(10) Patent No.: US 11,861,908 B2
(45) Date of Patent: Jan. 2, 2024

(54) METHODS, SYSTEMS, AND MEDIA FOR ADAPTIVE PRESENTATION OF A VIDEO CONTENT ITEM BASED ON AN AREA OF INTEREST

(71) Applicant: Google LLC, Mountain View, CA (US)

(72) Inventors: Scott Davies, Santa Monica, CA (US); Justin Lewis, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/108,874

(22) Filed: Feb. 13, 2023

(65) Prior Publication Data
US 2023/0186632 A1 Jun. 15, 2023

Related U.S. Application Data

(63) Continuation of application No. 17/107,056, filed on Nov. 30, 2020, now Pat. No. 11,580,740, which is a
(Continued)

(51) Int. Cl.
*G06F 17/00* (2019.01)
*G06V 20/40* (2022.01)
(Continued)

(52) U.S. Cl.
CPC ............ *G06V 20/46* (2022.01); *G06F 3/0481* (2013.01); *G06F 16/95* (2019.01); *G06V 20/44* (2022.01)

(58) Field of Classification Search
CPC ........ G06V 20/46; G06V 20/44; G06F 16/95; G06F 3/0481
See application file for complete search history.

(56) References Cited

U.S. PATENT DOCUMENTS 7,603,682 B1 10/2009 Akiyama et al.
7,716,361 B2 5/2010 Messer
(Continued)

OTHER PUBLICATIONS

International Search Report and Written Opinion dated Mar. 26, 2018 in International Patent Application No. PCT/US2018/017196.
(Continued)

*Primary Examiner* — Mohammed H Zuberi
(74) *Attorney, Agent, or Firm* — Lowenstein Sandler LLP

(57) ABSTRACT

Methods, systems, and media for adaptive presentation of a video content item based on an area of interest are provided. In some embodiments, the method comprises: causing a video content item to be presented within a viewport having first dimensions in connection with a web page, wherein the video content item is associated with area of interest information corresponding to one or more frames of the video content item; determining that the first dimensions associated with the viewport have changed in which the viewport is currently associated with second dimensions; determining that a modified video content item should be presented within the viewport having the second dimensions in response to determining that the first dimensions associated with the viewport have changed, wherein the modified video content item includes an area of interest based on the area of interest information associated with the video content item and wherein portions of at least one frame of the modified video content item are removed based on the second dimensions of the viewport; and causing the modified video content item to be presented within the viewport having the second dimensions.

21 Claims, 7 Drawing Sheets

Related U.S. Application Data continuation of application No. 15/587,725, filed on May 5, 2017, now Pat. No. 10,853,659.

(51) Int. Cl.
  *G06F 3/0481* (2022.01)
  *G06F 16/95* (2019.01)

(56) References Cited

U.S. PATENT DOCUMENTS

| | | |
|---|---|---|
| 7,952,596 B2 | 5/2011 | Thörn |
| 8,532,435 B1 | 9/2013 | Hegde et al. |
| 8,621,422 B1 | 12/2013 | Hsu et al. |
| 8,660,296 B1 | 2/2014 | Ioffe |
| 9,652,676 B1 | 5/2017 | Dey et al. |
| 10,257,436 B1 | 4/2019 | Zhang et al. |
| 2005/0163224 A1 | 7/2005 | Shin et al. |
| 2005/0198575 A1 | 9/2005 | Liu et al. |
| 2006/0026302 A1 | 2/2006 | Bennett et al. |
| 2013/0311871 A1 | 11/2013 | Turner et al. |
| 2014/0026053 A1 | 1/2014 | Huang et al. |
| 2014/0270533 A1 | 9/2014 | Chedeau |
| 2015/0078723 A1 | 3/2015 | Curcio et al. |
| 2015/0095957 A1* | 4/2015 | Ravi ............ H04N 21/4398 725/87 |
| 2017/0062012 A1 | 3/2017 | Bloch et al. |
| 2017/0150097 A1 | 5/2017 | Dove et al. |
| 2017/0212771 A1 | 7/2017 | Weissberg et al. |
| 2017/0270533 A1 | 9/2017 | Henry et al. |
| 2017/0316806 A1 | 11/2017 | Warren et al. |
| 2018/0101731 A1 | 4/2018 | Shah et al. |
| 2018/0288440 A1 | 10/2018 | Chao |
| 2018/0322346 A1 | 11/2018 | Davies et al. |
| 2019/0294883 A1 | 9/2019 | Pathak et al. |
| 2020/0074156 A1 | 3/2020 | Janumpally et al. |
| 2020/0162770 A1 | 5/2020 | Pavetic et al. |

OTHER PUBLICATIONS

Notice of Allowance dated Jul. 27, 2020 in U.S. Appl. No. 15/587,725.
Notice of Allowance dated Oct. 14, 2022 in U.S. Appl. No. 17/107,056.
Office Action dated Apr. 7, 2022 in U.S. Appl. No. 17/107,056.
Office Action dated May 1, 2019 in U.S. Appl. No. 15/587,725.
Office Action dated Sep. 30, 2021 in U.S. Appl. No. 17/107,056.
Office Action dated Oct. 30, 2019 in U.S. Appl. No. 15/587,725.

\* cited by examiner

METHODS, SYSTEMS, AND MEDIA FOR ADAPTIVE PRESENTATION OF A VIDEO CONTENT ITEM BASED ON AN AREA OF INTEREST

CROSS-REFERENCE TO RELATED APPLICATIONS

This application is a continuation of U.S. patent application Ser. No. 17/107,056, filed Nov. 30, 2020, which is a continuation of U.S. patent application Ser. No. 15/587,725, filed May 5, 2017, each of which is hereby incorporated by reference herein in its entirety.

TECHNICAL FIELD

The disclosed subject matter relates to methods, systems, and media for adaptive presentation of a video content item based on an area of interest. More particularly, the disclosed subject matter relates to automatically filling a media content space, such as a video window being presented on a page, with selected portions of the frames of a video content item.

BACKGROUND

Video content items are frequently presented in video windows having various shapes and sizes. However, given the shapes and sizes of these video windows and the sometimes varying sizes of these video window, video content items may not match the shape and/or size of the video window in which they are being presented. Oftentimes, video players compensate for this by scaling the video content item so that the scaled video content item fits completely within the particular dimensions of the video window. This typically requires warping the aspect ratio of the video content item and/or creating black spaces or other blank regions in the video window. This can, for example, cause the video content item to be considered unviewable by the user.

Moreover, video content items being presented on web pages are sometimes obstructed as a result of a user scrolling or navigating to view other content on the web page. As a result, the viewable portion of the video may be a bottom portion or a top portion of the video content item.

Accordingly, it is desirable to provide new methods, systems, and media for methods, systems, and media for adaptive presentation of a video content item based on an area of interest.

SUMMARY

Methods, systems, and media for adaptive presentation of a video content item based on an area of interest are provided.

In accordance with some embodiments of the disclosed subject matter, a method for adaptive presentation of media content is provided, the method comprising: causing, using a hardware processor, a video content item to be presented within a viewport having first dimensions in connection with a web page, wherein the video content item is associated with area of interest information corresponding to one or more frames of the video content item; determining, using that hardware processor, that the first dimensions associated with the viewport have changed in which the viewport is currently associated with second dimensions; determining, using that hardware processor, that a modified video content item should be presented within the viewport having the second dimensions in response to determining that the first dimensions associated with the viewport have changed, wherein the modified video content item includes an area of interest based on the area of interest information associated with the video content item and wherein portions of at least one frame of the modified video content item are removed based on the second dimensions of the viewport; and causing, using that hardware processor, the modified video content item to be presented within the viewport having the second dimensions.

In accordance with some embodiments of the disclosed subject matter, a system for adaptive presentation of media content is provided, the system comprising: a hardware processor that is configured to: cause a video content item to be presented within a viewport having first dimensions in connection with a web page, wherein the video content item is associated with area of interest information corresponding to one or more frames of the video content item; determine that the first dimensions associated with the viewport have changed in which the viewport is currently associated with second dimensions; determine that a modified video content item should be presented within the viewport having the second dimensions in response to determining that the first dimensions associated with the viewport have changed, wherein the modified video content item includes an area of interest based on the area of interest information associated with the video content item and wherein portions of at least one frame of the modified video content item are removed based on the second dimensions of the viewport; and cause the modified video content item to be presented within the viewport having the second dimensions.

In accordance with some embodiments of the disclosed subject matter, non-transitory computer-readable media containing computer executable instructions that, when executed by a processor, cause the processor to perform a method for adaptive presentation of media content is provided. In some embodiments, the method comprises: causing a video content item to be presented within a viewport having first dimensions in connection with a web page, wherein the video content item is associated with area of interest information corresponding to one or more frames of the video content item; determining that the first dimensions associated with the viewport have changed in which the viewport is currently associated with second dimensions; determining that a modified video content item should be presented within the viewport having the second dimensions in response to determining that the first dimensions associated with the viewport have changed, wherein the modified video content item includes an area of interest based on the area of interest information associated with the video content item and wherein portions of at least one frame of the modified video content item are removed based on the second dimensions of the viewport; and causing the modified video content item to be presented within the viewport having the second dimensions.

In accordance with some embodiments of the disclosed subject matter, a system for adaptive presentation of media content is provided, the system comprising: means for causing a video content item to be presented within a viewport having first dimensions in connection with a web page, wherein the video content item is associated with area of interest information corresponding to one or more frames of the video content item; means for determining that the first dimensions associated with the viewport have changed in which the viewport is currently associated with second dimensions; means for determining that a modified video content item should be presented within the viewport having the second dimensions in response to determining that the first dimensions associated with the viewport have changed, wherein the modified video content item includes an area of interest based on the area of interest information associated with the video content item and wherein portions of at least one frame of the modified video content item are removed based on the second dimensions of the viewport; and means for causing the modified video content item to be presented within the viewport having the second dimensions.

In some embodiments, the area of interest in the modified video content item is centered within the viewport and the portions of the area of interest falling outside of the centered area of interest within the viewport are removed. In some embodiments, the portions of the area of interest falling outside of the centered area of interest within the viewport are removed by cropping the area of interest.

In some embodiments, the area of interest has a first video dimension and a second video dimension, the first video dimension is shorter than the second video dimension, and the area of interest is modified to fit within the viewport having the second dimensions such that the first video dimension fits entirely within the viewport and the portions of the area of interest falling outside of the viewport are cropped.

In some embodiments, determining that the first dimensions associated with the viewport have changed further comprises determining that a presentation mode for presenting the video content item has changed from a first presentation mode to a second presentation mode.

In some embodiments, the viewport is presented at a particular location on the web page and determining that the first dimensions associated with the viewport have changed further comprises determining that navigation actions have been performed such that at least a portion of the viewport is not in view on the web page.

In some embodiments, the system further comprises means for receiving a markup document associated with the web page, wherein the markup document includes parameters that define viewport dimensions for a given time of the video content item, wherein the viewport dimensions in the parameters of the markup document indicate a rectangular viewing portion of the video content item.

In some embodiments, the modified video content item includes a first area of interest based on the area of interest information corresponding to a first time in the video content item and a second area of interest based on the area of interest information corresponding to a second time in the video content item.

In some embodiments, the system further comprises means for generating an overlay that includes the modified video content item and the viewport having the second dimensions, wherein the overlay is rendered as a video layer that is positioned over a page layer including web page content and wherein the video content item is modified based on the web page content currently being presented.

In some embodiments, the system further comprises: means for transmitting a query for a modified version of the video content item, wherein the query includes a video identifier that identifies the video content item and the second dimensions of the viewport; and means for receiving the modified video content item for presentation within the viewport having the second dimensions.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
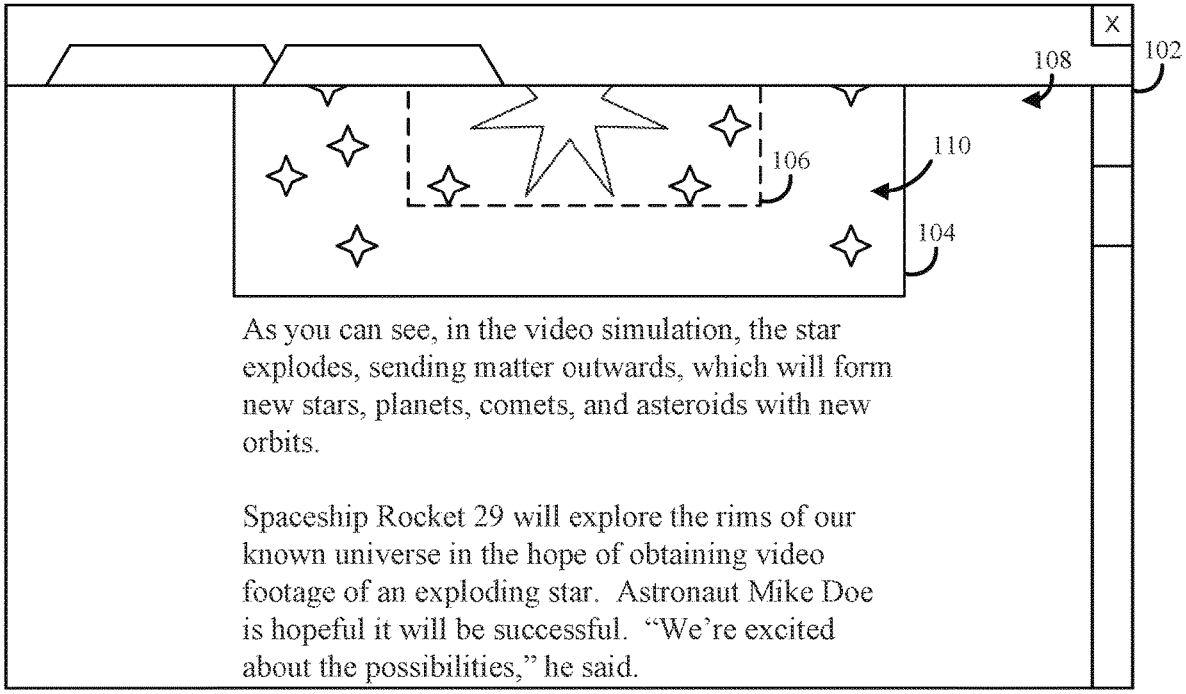
FIG. 1A shows an illustrative example of a presentation of a web page that includes a video content item that includes an area of interest in accordance with some embodiments of the disclosed subject matter.

In accordance with various embodiments of the disclosed subject matter, mechanisms (which can include methods, systems, and media) for adaptive presentation of a video content item based on an area of interest are provided.

Generally speaking, the mechanisms can alter the presentation of a video content item such that an area of interest within the video content item is selected for presentation. For example, in some embodiments, the mechanisms can determine that a video content item being presented as part of a webpage is partially out of view, such as when a user navigates away from the video content item by scrolling through a web page and causing a portion of the video content item to be partially out of view. In another example, in some embodiments, the mechanisms can determine that a video content item being presented as part of a webpage is partially obstructed, such as when another window, overlay, or other suitable object is positioned over a portion of the video content item. In response, the mechanisms can determine the size of the available area of the video content item (e.g., the dimensions of the portion of the video content item that remains in view), and cause the area of interest to be displayed within that available area. In continuing this example, the mechanisms can cause the area of interest that is selected for presentation to be centered within the available area. It should be noted that, in some embodiments, the area of interest can be zoomed in or otherwise increased in size to generate a modified video content item that is focused on the area of interest. Additionally, in some embodiments, the mechanisms can remove or otherwise inhibit the presentation of the portions of the video content item outside of the area of interest that does not fit within the available area (e.g., by cropping the frames of the video content item).

In some embodiments, the mechanisms can alter the presentation of a video content item to accommodate a video viewport or any other suitable media content space designated for presenting the video content item, such as a relatively small video viewport in comparison to a default size of an originally presented viewport. For example, the mechanisms can determine that the dimensions of a video viewport that are available for presenting a video content item can dynamically change, such as when a user navigates away from the video content item and the video viewport reduces in size (e.g., by scrolling through the web page, which causes a portion of the video content item within the video viewport to be partially out of view). In response, the mechanisms can determine the current dimensions of the video window (e.g., the dimensions of the portion of the video content item within the video window that remains in view on the web page) and can cause a determined area of interest from the video content item to be displayed within the current dimensions of the remaining video window. In continuing this example, the mechanisms can cause the area of interest that is selected for presentation to be centered within the current dimensions of the remaining video window.

It should be noted that, in some embodiments, the area of interest can be zoomed in or otherwise increased in size to generate a video content item that is focused on the area of interest and that is presented within the current dimensions of the remaining video window. It should also be noted that, in some embodiments, multiple areas of interest can be selected for a video content item, where a first area of interest is selected from a first video frame (or a set of video frames) of the video content item and a second area of interest is selected from a second video frame (or a set of video frames) of the video content item.

It should further be noted that, in some embodiments, the mechanisms can position the video content item within the video viewport such that the area of interest can be presented within the video viewport and portions of the video content item outside of the area of interest can be removed or otherwise inhibited from being presented within the video viewport. This can, for example, cause the presentation of the area of interest to be maximized or focused (e.g., by zooming into or increasing the scale of the area of interest) and cropping out the areas of the video content item that would not fit within the viewport.

In some embodiments, the mechanisms can alter the presentation of the video content item by selecting a version of the video content item that is deemed appropriate for the dimensions of the currently provided video viewport (e.g., a version that fits within a video viewport of particular dimensions). For example, rather than selecting a version of the video content item that would fit completely within a small video viewport, that would have a low resolution, and that would leave black regions within the video viewport, the mechanisms can select a version of the video content item containing the region of interest having a higher resolution, where the area of interest can fit completely or nearly completely within the dimensions of the video viewport. In continuing this example, these mechanisms can also remove portions of the video content item outside of the area of interest such that there will be no black spaces or black regions in the video viewport (e.g., by cropping).

It should be noted that, in some embodiments, the mechanisms can determine an area of interest for multiple frames of a video content item and dynamically modify the presentation of the video content item (e.g., each time the area of interest changes for a video content item). For example, the mechanisms can re-center and/or re-crop the video content item at each frame of the video content item having a different area of interest.

In some embodiments, the mechanisms can cause a video content item being presented on a web page to continue being presented in response to the user navigating to another web page. For example, the mechanisms can cause an overlay element that includes the video content item to be presented over the original web page and, in response to determining that the other web page also includes the same video content item, the mechanisms can continue presenting the video content item while the content of the other web page is rendered around the video content item.

Turning to FIG. 1A, FIG. 1A shows an illustrative example of a presentation of a web page that includes a video content item that includes an area of interest in accordance with some embodiments of the disclosed subject matter. As shown in FIG. 1A, in some embodiments, a web browser 102 can present a web page 108 that includes a video player 104 presenting a video content item 110 that includes an area of interest 106.

In some embodiments, web browser 102 can be any suitable web browser application. For example, web browser 102 can be an independent web browser application (e.g., an application configured particularly for web browsing), a dedicated web browser application (e.g., a web browser application for accessing specific web sites), an in-app web browser application (e.g., a web browser application that is integrated with the functionality of another application), or any other application suitable for presenting web content.

In some embodiments, video player 104 can be any suitable video player. For example, video player 104 can be a HyperText Markup Language (HTML) video player, a video player included in web browser 102, a video player plugin for web browser 102, a native video player, or any other suitable video player.

Figure 1B:
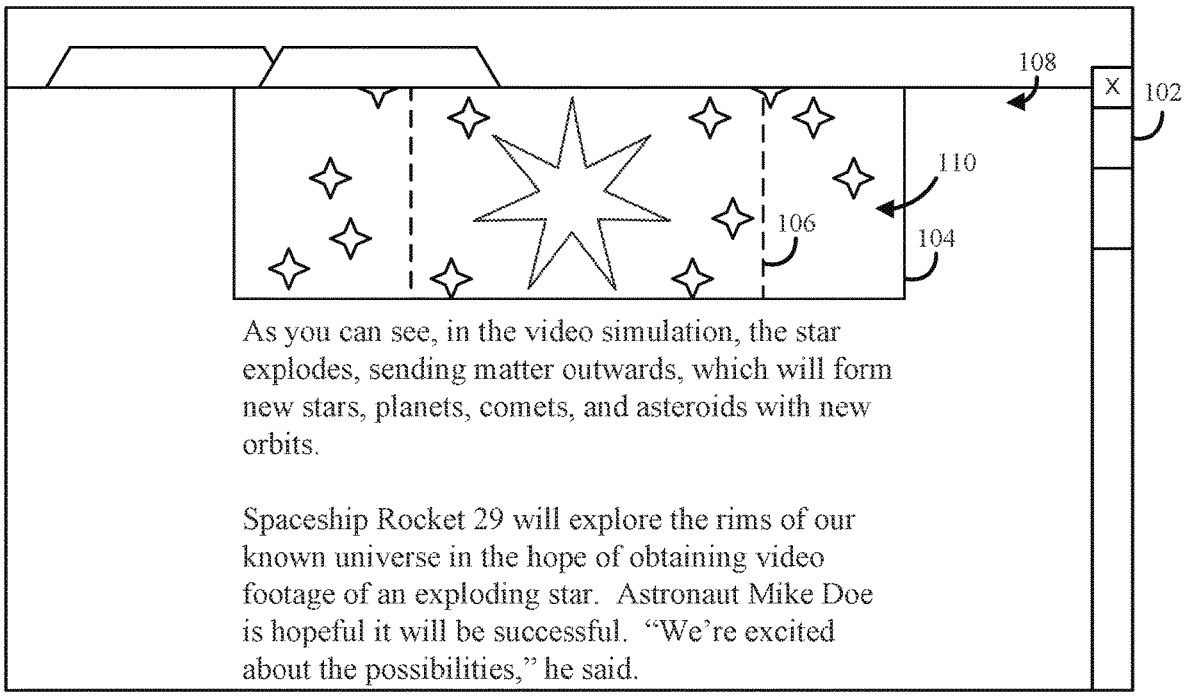
FIG. 1B shows an illustrative example of another presentation of the web page of FIG. 1A that includes the video content item of FIG. 1A, where the presentation of the video content item has been altered based on the area of interest, in accordance with some embodiments of the disclosed subject matter.
Figure 1C:
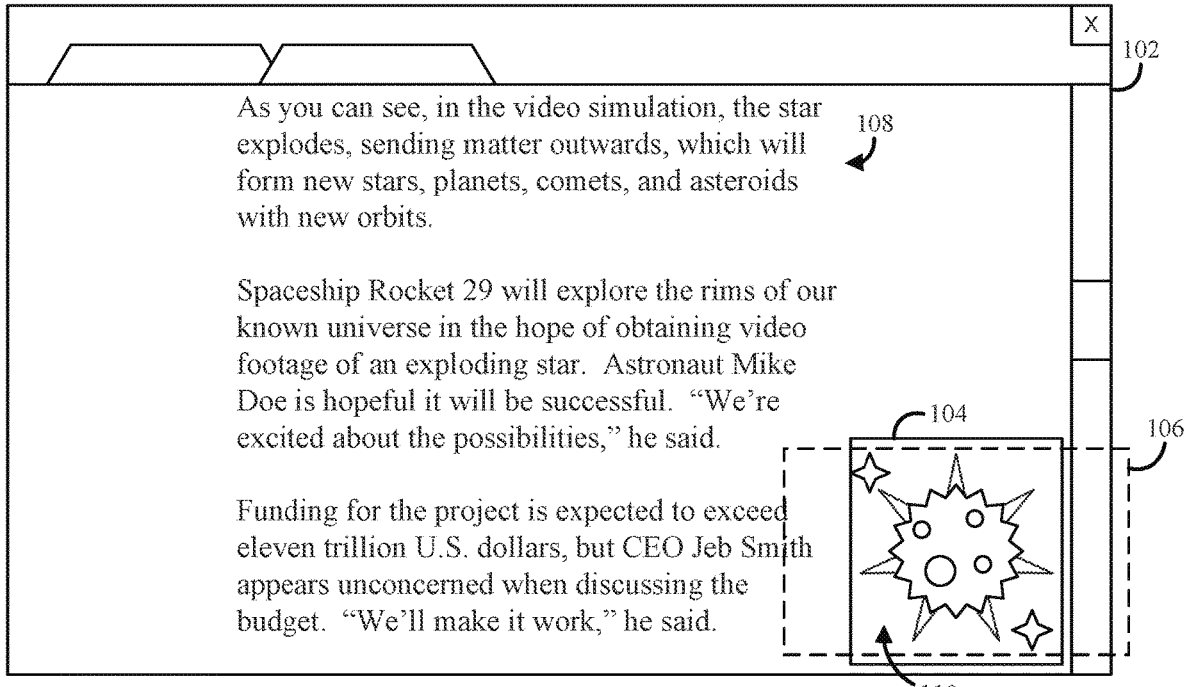
FIG. 1C shows an illustrative example of yet another presentation of the web page of FIGS. 1A and 1B that includes the video content item of FIGS. 1A and 1B, where the video content item is presented in a scrolling mode, in accordance with some embodiments of the disclosed subject matter.

In some embodiments, video player 104 can present video content item 110 in one or more presentation modes. For example, as illustrated in FIGS. 1A and 1B, video player 104 can present video content item 110 in a static position mode (e.g., a mode where the video player remains in the same position relative to the other content on the web page as the user navigates through the web page). As another example, as illustrated in FIG. 1C, video player 104 can present video content item 110 in a scrolling mode (e.g., a mode where the video player has a viewport having particular dimensions and remains in a particular position of the web browser as the user navigates through the web page). A viewport, such as the viewport of video player 104 shown in FIG. 1C, can be relatively small in size when compared with the dimensions of web browser 102. As yet another example, video player 104 can present video content item 110 in a full screen mode (e.g., a mode where the video player has a viewport that is relatively large in size such that the viewport occupies all or substantially all of the web browser). As a further example, video player 104 can present video content item 110 in a thumbnail mode (e.g., a mode where the video player has a viewport that is relatively small in size when compared with the dimensions of the web browser and remains in the same position in the web browser even as the web page is navigated). As a more particular example, video player 104 can present video content item 110 in a thumbnail mode when presenting video content item 110 in a list of search results (e.g., provided in a response to a search query).

Figure 1D:
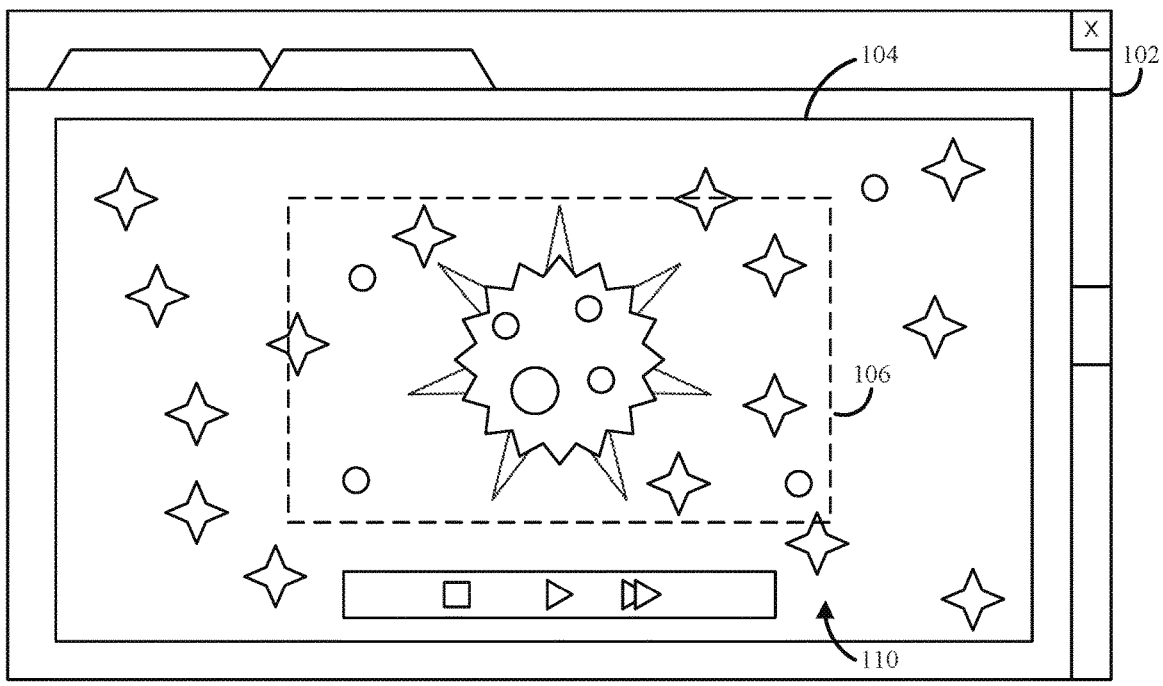
FIG. 1D shows an illustrative example of still another presentation of the web page of FIGS. 1A, 1B, and 1C that includes the video content item of FIGS. 1A, 1B, and 1C, where the video content item is presented in a full screen mode, in accordance with some embodiments of the disclosed subject matter.

In some embodiments, video player 104 can be configured such that, when video player 104 is in a thumbnail mode or in a scrolling mode, a user selection of video player 104 (e.g., a mouse click within video player 104) can cause the video player to enter a full screen mode (e.g., a full screen mode as illustrated in FIG. 1D). In some embodiments, upon receiving such a user selection, video player 104 can expand across web page 108 and display progressively more of previously cropped areas of video content item 110 until video content item 110 is displayed in full.

In some embodiments, video content item 110 can include an area of interest 106. It should be noted that, although area of interest 106 is presented with a dashed boundary line in FIGS. 1A-1D to show an area of interest within a video content item, this is merely illustrative and area of interest 106 may be invisible and may not include a boundary line or a boundary box.

In some embodiments, area of interest 106 can be any suitable area of interest in connection with video content item 110. For example, area of interest 106 can be an area of interest as discussed below in connection with FIGS. 2-4.

As shown in FIGS. 1A and 1B, in some embodiments, the presentation of video content item 110 can be partially obstructed and/or cut off within web browser 102 due to, for example, the web page being scrolled down such that a top area of video player 104 has been cut off and is out of view. In some embodiments, in response to video content item 110 being partially obstructed, cut off, or otherwise out of view, the mechanisms described herein can cause the presentation of video content item 110 to be altered based on area of interest 106. For example, as illustrated in FIG. 1B, the mechanisms can cause the presentation of video content item 110 to be centered on area of interest 106 and/or shifted such that area of interest 106 is presented within the unobstructed portion of video player 104. In such an example, as also illustrated in FIG. 1B, areas at the top and bottom of video content item 110 can be cropped (e.g., as described below in connection with FIG. 2) such that area of interest 106 is fully displayed within the unobstructed portion of video player 104. Additionally or alternatively, in some embodiments, if area of interest 106 is too large to be displayed fully, the mechanisms can cause a top, bottom, left, and/or right portions of area of interest 106 to be cropped or otherwise removed (e.g., as described below in connection with FIG. 2). For example, as shown in FIG. 1C, video player 104 can present video content item 110 in a relatively small viewport where area of interest 106 is larger in size than the size of the viewport. In such an example, as illustrated in FIG. 1C, the mechanisms can cause a left area and a right area of video content item 110 to be cropped or otherwise removed from being presented.

In some embodiments, the mechanisms can use any suitable process for causing the presentation of video content item 110 to be altered based on area of interest 106. For example, the mechanisms can use process 200 as described below in connection with FIG. 2, process 300 as described below in connection with FIG. 3, process 400 as described below in connection with FIG. 4, and/or any other suitable process or any suitable combination thereof.

Figure 2:
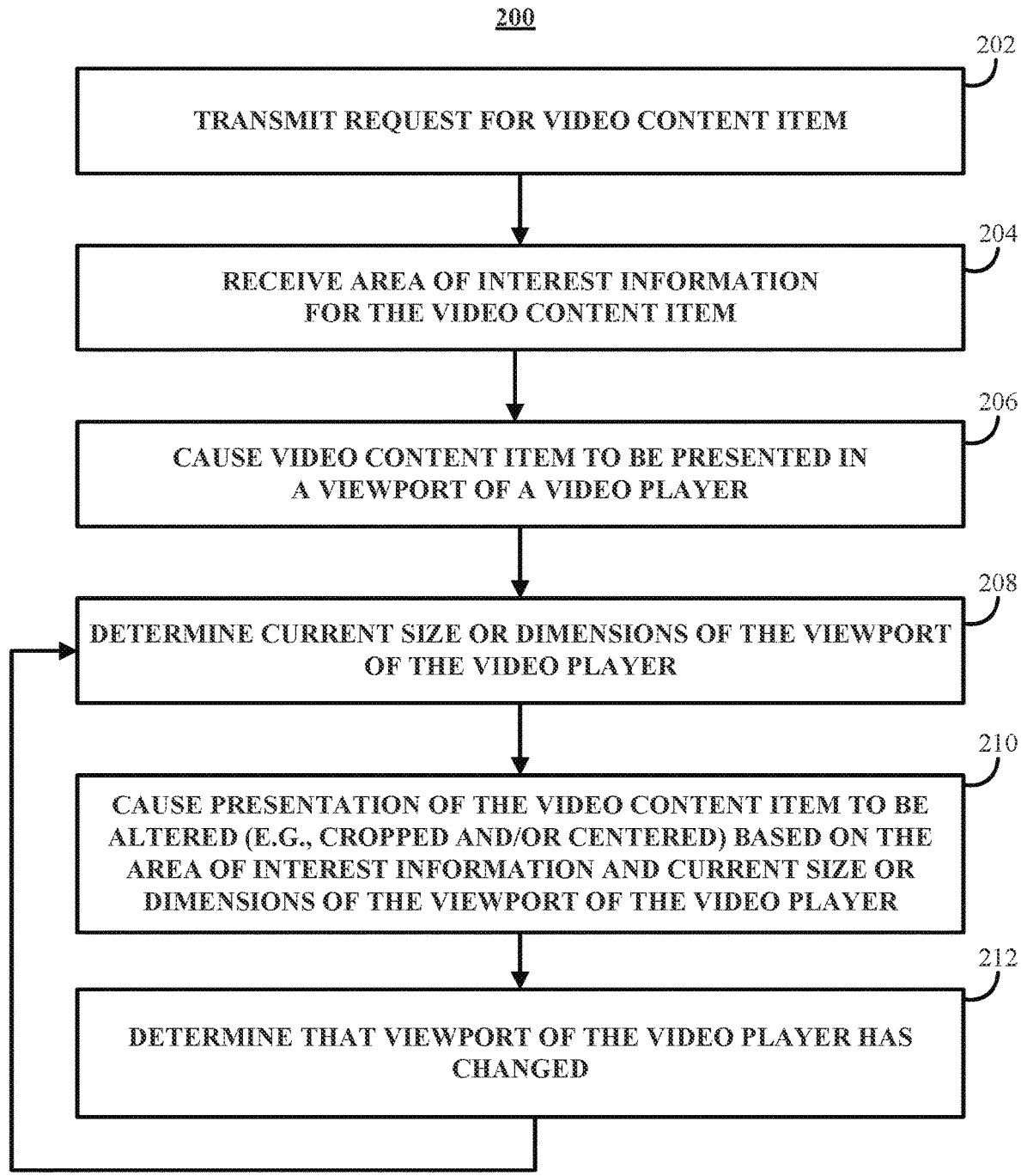
FIG. 2 shows an illustrative example of a process for adaptive presentation of a video content item based on an area of interest in accordance with some embodiments of the disclosed subject matter.

FIG. 2 shows an illustrative example 200 of a process for altering presentation of a video content item based on an area of interest in accordance with some embodiments of the disclosed subject matter.

At 202, in some embodiments, process 200 can transmit a request for a video content item. In some embodiments, process 200 can transmit the request for a video content item using any suitable technique or combination of techniques. For example, process 200 can transmit the request for the video content item to a particular URL that is included in a received web page. In another example, process 200 can transmit a search query for a video content item.

At 204, in some embodiments, process 200 can receive area of interest information for the video content item.

In some embodiments, the area of interest information can be associated with any suitable area of interest. For example, the area of interest information can be associated with an area of interest as described above in connection with FIGS. 1A, 1B, 1C, and 1D.

In some embodiments, process 200 can receive area of interest information from any suitable source. For example, process 200 can receive area of interest information in connection with the requested video content item. As a more particular example, the requested video content item can be provided to process 200 with a video tag that includes the area of interest information (e.g., as described below in connection with FIG. 4). As another example, process 200 can receive area of interest information in connection with a web page that includes the video content item. As a more particular example, the web page can include a video tag that includes the area of interest information (e.g., as described below in connection with FIG. 4). As yet another example, process 200 can request the area of interest information from a database of area of interest information, where a query with a video content item identifier can be transmitted to a database of area of interest information and responsive area of interest information can be received from the database of area of interest information.

In some embodiments, the area of interest information can include any suitable information related to the size and/or shape of the area of interest. For example, the area of interest information can include proportions associated with the video content item, such as a height proportion and/or a width proportion that define the size of an area of interest. As another example, the area of interest information can include a number of pixels that define the size of an area of interest. As yet another example, the area of interest information can include identifiers associated with pixels within and/or surrounding the area of interest, coordinates associated with the area of interest, any other suitable information related to the size and/or shape of the area of interest, or any suitable combination thereof. As still another example, the area of interest information can include information related to a shape for the area of interest. As a more particular example, the information can include the type of shape (e.g., square, rectangle, circle, ellipse, and/or any other suitable shape) and information about the size and/or character of the shape (e.g., a radius in connection with a circle, and/or foci in connection with an ellipse).

In some embodiments, the area of interest information can include information related to the location of the area of interest. For example, the area of interest information can include a center point of the area of interest, a vertical offset of the area of interest, a horizontal offset of the area of interest, coordinates of the area of interest, any other information related to the location of the area of interest, or any suitable combination thereof.

In some embodiments, the area of interest information can include information related to a minimum size of a video player viewport required to present the video content item. For example, the area of interest information can include a minimum proportion of the height, width, and/or area of the video content item required. In some embodiments, in response to the video player viewport being below such a minimum, process 200 can take any suitable action (e.g., an action as described below in connection with 210 of FIG. 2).

In some embodiments, the area of interest information can include identification information related to an entity that appears within the video content item. For example, the area of interest information can include identifying information relating to a person. In continuing this example, the identifying information can be transmitted to an image recognition system that determines an area of interest within frames of the video content item in which the person appears. In another example, each video content item can have different areas of interest associated with different entities and, in response to determining which of the different entities that a viewer of the video content item may be interested in, the identifying information can be used to select one of the different areas of interest to present.

In some embodiments, the area of interest information can include any suitable information related to an area of interest within the video content item. For example, the area of interest information can include area of interest parameters as described below in connection with FIG. 3.

At 206, in some embodiments, process 200 can cause the video content item to be presented in a viewport of a video player.

In some embodiments, process 200 can cause the video content item to be presented in any suitable video viewport. For example, process 200 can cause the video content item to be presented in a video viewport of a video player (e.g., a video player as described above in connection with FIGS. 1A, 1B, 1C, and 1D).

At 208, in some embodiments, process 200 can determine the current size of the video viewport that is being presented.

In some embodiments, process 200 can determine the current size of the video viewport using any suitable technique or combination of techniques. For example, in a situation where the video viewport is being presented on a web page using a web browser, process 200 can query the web browser for the current size of the video viewport. As another example, in a situation where the video viewport is being presented using a native video player, process 200 can determine the size of the video viewport based on the pixels being used to present the video viewport. As yet another example, in a situation where process 200 is being executed by a web browser, process 200 can determine the current size of the video viewport based on the web browser's rendering of the web page and the location of web browser's user interface.

In some embodiments, process 200 can determine the current size of the video viewport at predetermined intervals. For example, process 200 can transmit a query to the video player for the current size of the viewport at every second. In another example, process 200 can determine the current size of the video viewport based on the information received from a tag executing on a web browser (e.g., where the viewport information is received every one-tenth of a second).

At 210, process 200 can cause the presentation of the video content item to be altered based on the area of interest information and the current size of the viewport.

In some embodiments, process 200 can cause the presentation of the video content item to be altered using any suitable technique or combination of techniques. For example, process 200 can transmit and/or pass the received area of interest information to a video player being used to present the video content item (e.g., a video player as described below in connection with FIGS. 1A, 1B, 1C, and 1D).

In some embodiments, process 200 can cause the presentation to be altered by causing the presentation of the video content item to be shifted based on the area of interest information. For example, the presentation of the video content item can be shifted as described above in connection with FIGS. 1A, 1B, 1C, and 1D. As another example, process 200 can cause the video player to shift the presentation of the video content item such that the area of interest is fully displayed within the viewport.

In some embodiments, process 200 can cause the presentation of the video content item to be shifted within the viewport of the video player based on any suitable criteria. For example, process 200 can cause the presentation of the video content item to be shifted by a minimum amount required to fully present the area of interest within the viewport. As another example, process 200 can cause the presentation of the video content item to be shifted based on a center point of the area of interest (e.g., by centering the center point within the viewport).

In some embodiments, process 200 can cause the presentation to be altered by causing areas of the video content item to be cropped based on the area of interest in relation to the current size of the viewport. For example, process 200 can cause the video player to crop areas of the video content item as described above in connection with FIGS. 1A, 1B, 1C, and 1D.

In some embodiments, process 200 can cause areas of the video content item to be cropped or otherwise removed based on any suitable criteria. For example, process 200 can cause areas of the video content item to be removed based on the shift of the presentation within the viewport (e.g., by cropping the area of the video content item that would lie outside the viewport following the shift). As another example, process 200 can cause the areas of the video content item to be cropped such that no blank space is produced in the viewport. As yet another example, process 200 can cause areas of the video content item to be cropped such as to maximize the amount of the area of interest that is presented. As a more particular example, in a situation where at one dimension of the viewport is too small to fit a corresponding dimension of the area of interest, but another dimension of the viewport is larger than the corresponding dimension of the area of interest, the corresponding the dimension of the area of interest that is too small can be cropped such that it matches the corresponding dimension of the viewport (e.g., as described above in connection with FIG. 1C).

In some embodiments, process 200 can cause the presentation to be altered by transmitting the current size of the viewport to a video server (e.g., a video server as described below in connection with FIG. 5). For example, process 200 can transmit the current size of the viewport to a video server such that the video server transmits an altered version of the video content item to the video player. In such an example, the video server can adapt the video content item to the available video viewport by cropping the video content item, shifting and/or centering the remaining portions of the video content item, altering the video content item as described above in connection with FIGS. 1A, 1B, 1C, and 1D, altering the video content item using any other suitable technique, or altering the video content item using any suitable combination thereof.

In some embodiments, process 200 can cause the presentation to be altered by causing a different version of the video content item to be presented. For example, process 200 can determine that the current size of the viewport would not be able to present all of the area of interest, and in response to the determination, cause an available smaller version (e.g., a lower definition version) of the video content item to be presented (e.g., by transmitting a request for the smaller version). In such an example, process 200 can then crop and/or shift the presentation of the smaller version. Additionally or alternatively, process 200 can determine that the current size of the viewport would be able to present all of the area of interest of an available larger version (e.g., a higher definition version) of the video content item, and in response to the determination, cause the available larger version of the video content item to be presented (e.g., by transmitting a request for the larger version).

In some embodiments, process 200 can cause the presentation to be altered by causing the video player to enter a different presentation mode (e.g., a presentation mode as described above in connection with FIGS. 1A, 1B, 1C, and 1D). For example, in a situation where a video content item is being presented as part of a web page and the web page is navigated by scrolling past the video content item, process 200 can cause the video player to enter a scrolling mode as described below in connection with FIG. 1C. Additionally or alternatively, in some embodiments, process 200 can determine a minimum size of the viewport and, in response to the viewport being reduced to below the minimum size, as a result of the web page being scrolled down, can cause the video player to enter a scrolling mode as described above in connection with FIG. 1C.

At 212, in some embodiments, process 200 can determine that the viewport of the video player has changed. For example, process 200 can determine that the dimensions of the viewport have changed. In another example, process can determine that the presentation mode of the viewport has changed (e.g., from full screen mode to scrolling mode).

In some embodiments, process 200 can determine that the viewport of the video player has changed using any suitable technique or combination of techniques. For example, process 200 can receive a user request to scroll down on a window that is presenting the viewport (e.g., a window of a web browser that is presenting the viewport). As another example, process 200 can query the video player to determine that the viewport of the video player has changed.

In some embodiments, in response to determining that the viewport of the video player has changed, process 200 can return to 208 and re-determine the current size of the viewport of the video player.

Figure 3:
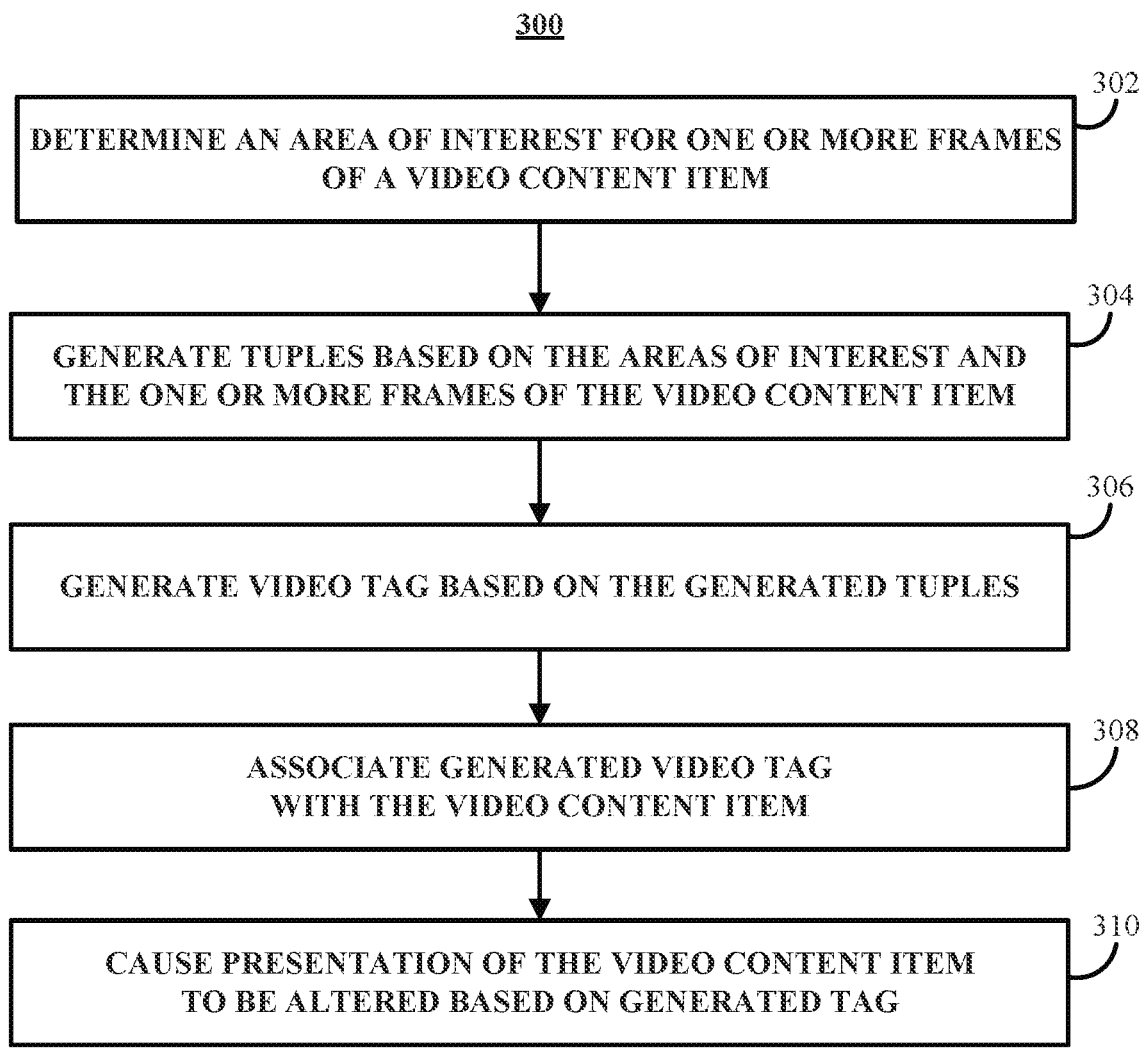
FIG. 3 shows an illustrative example of a process for determining one or more areas of interest within a video content item and causing the video content item to be presented based on the one or more areas of interest in accordance with some embodiments of the disclosed subject matter.

FIG. 3 shows an illustrative example 300 of a process for determining an area of interest in a video content item and causing the video content item to be presented based on the area of interest in accordance with some embodiments of the disclosed subject matter.

At 302, in some embodiments, process 300 can determine an area of interest for one or more frames of a video content item.

In some embodiments, process 300 can determine an area of interest by receiving a user input for the area of interest. For example, process 300 can receive a user selection of a portion of a screen (e.g., via a click, a click-and-drag, or any other suitable user input) that is presenting the video, and determine the area of interest based on the user selection. As another example, process 300 can receive a user input of area of interest information as discussed above in connection with FIG. 2. As a more particular example, process 300 can receive a user input of proportions, shapes, coordinates, and/or any other suitable information that can be used to determine the area of interest. In yet another example, when uploading a video content item to a video sharing service, process 300 can present a user interface for indicating particular portions from one or more video frames of the video content that are deemed important to the uploading user.

In some embodiments, process 300 can determine an area of interest by presenting a user interface for browsing the frames of a video content item that is configured to receive a user input for determining the area of interest. For example, process 300 can present a user interface that allows a user to draw the area of interest on one or more frames of the video content item. As another example, process 300 can present a user interface that allows a user to select a shape, size, coordinates, any other suitable information related to an area of interest, or any suitable combination thereof.

In some embodiments, process 300 can determine an area of interest using ant suitable detection technique. For example, process 300 determine an area of interest using object recognition technique, visual scene processing technique, machine learning technique, and/or any other suitable technique. In some embodiments, process 300 can use such a technique to find objects of interest within a video content item and use the identified objects of interest to determine an area of interest. For example, process 300 can use an image recognition technique to identify a basketball in a video of a basketball game, and determine the area of interest based on the location of the basketball in a given frame. As another example, process 300 can use an image recognition technique to identify one or more faces within a video, and determine an area of interest based on the location of the one or more faces in a given frame of the video.

In some embodiments, process 300 can determine an area of interest based on gaze tracking information. For example, in response receiving affirmative authorization from a user of a user device to track the user's gaze using an imaging device associated with the user device, process 300 can use a gaze tracking technique to determine which areas of a video that the user is focused on while presenting a video, and determine an area of interest for one or more frames of the video based on the determined areas that the user was focused on.

At 304, in some embodiments, process 300 can generate tuples based on the areas of interest and the one or more frames of the video content item.

In some embodiments, process 300 can generate tuples that include any suitable information related to the one or more frames of the video content item that correspond to an area of interest. For example, the tuples can include an identifier for each of the one or more frames that correspond to an area of interest determined at 302. As another example, the tuples can include a time of the video that corresponds to each of the one or more frames that correspond to an area of interest determined at 302.

In some embodiments, process 300 can generate tuples that include any suitable information related to an area of interest determined at 302. For example, process 300 can include area of interest information as described above in connection with FIG. 2.

In some embodiments, each tuple can include information related to one of the frames that correspond to an area of interest and area of interest information associated with the frame.

In some embodiments, each tuple can correspond to a key frame of the video content item. For example, each tuple can correspond to a frame in which the determined area of interest changes. As a more particular example, process 300 can determine an area of interest for a frame $F_x$ that applies to each consecutive frame $F_{x+n}$, until frame $F_{x+n+1}$ wherein frame $F_{x+n+1}$ has a different determined area of interest from frame $F_x$ and is a key frame.

At 306, in some embodiments, process 300 can generate a video tag based on the generated tuples.

In some embodiments, process 300 can generate a video tag that includes any suitable information related to the tuples. For example, process 300 can generate a video tag that includes each generated tuple. As another example, process 300 can generate a video tag that includes a URL where the tuples can be accessed. As another example, process 300 can generate a video tag that includes each generated tuple that corresponds to a key frame (e.g., a key frame as discussed above in connection with 304).

At 308, in some embodiments, process 300 can associate the generated video tag with the video content item.

In some embodiments, process 300 can associate the generated video tag with the video content item using any suitable technique or combination of techniques. For example, process 300 can include the generated tag in metadata associated with the video content item. As another example, process 300 can embed the generated video tag within the video content item. As yet another example, process 300 can store the generated video tag in a database in connection with an identifier for the video content item. As yet another example, process 300 can embed the generated video tag in a URL associated with the video content item. As still another example, the generated video tag can be included in a web page (e.g., included in the HTML, code for the web page) that also includes the video content item.

At 310, in some embodiments, process 300 can cause a presentation of the video content item to be altered based on the generated video tag.

In some embodiments, process 300 can cause a presentation of the video content item to be altered based on the generated video tag using any suitable technique or combination of techniques. For example, process 300 can cause a presentation of the video content item to be altered using a technique as described above in connection with FIG. 2.

In some embodiments, in a situation where the video content item is presented in connection with a web page, process 300 can present the video content item and, in some instances, an adapted or modified video content item by causing the video content item be presented in an overlay that is positioned over the web page. For example, a web page can include a page layer that includes web page content associated with the web page. In continuing this example, using embedded tags or other suitable instructions, the web page can cause a video content layer to be rendered as an overlay that is positioned over the page layer including the web page content. In continuing this example, as the page layer including the web page content changes, the video content layer can be adapted and/or updated to reflect the changes to the page layer (e.g., due to navigation through the web page content in the page layer). In addition, the video content item can be adapted and/or modified in the video content layer based on area of interest information and based on the current parameters of the video viewport. In such an example, process 300 can transmit an altered version of the video content item (e.g., a version of the video content item that has been altered as described above in connection with FIGS. 1A, 1B, 1C, 1D, and 2) to the application being used to present the web page.

In another suitable example, a page layer of a web page can include an area specified for presenting the video content item using a video player, such as a video viewport having particular dimensions, and process 300 can cause the application being used to present the web page to render the video content item in an overlay that is positioned over the specified area. In such an example, process 300 can transmit an altered version of the video content item (e.g., a version of the video content item that has been altered as described above in connection with FIGS. 1A, 1B, 1C, 1D, and 2) to the application being used to present the web page. In continuing this example, as the particular dimensions of the video viewport changes (e.g., in response to switching to a different presentation mode, in response to the video viewport being navigated such that a portion of the viewport is out of view, etc.), an adapted or modified video content item can be presented in an overlay that is positioned over the currently available video viewport.

Figure 4:
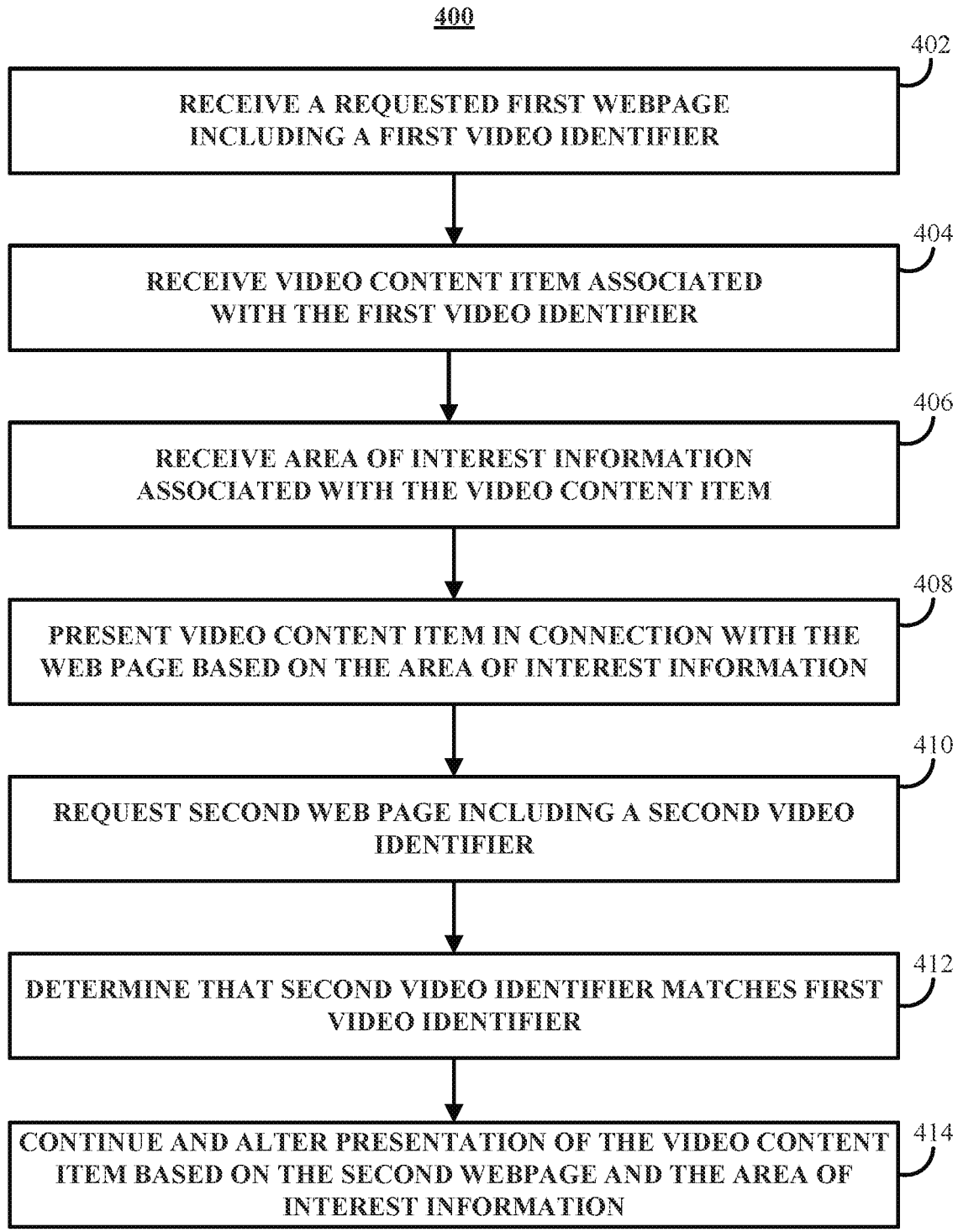
FIG. 4 shows an illustrative example of a process for continuously presenting a video content item across two webpages in accordance with some embodiments of the disclosed subject matter.

FIG. 4 shows an illustrative example 400 of a process for continuously presenting a video content item across two webpages in accordance with some embodiments of the disclosed subject matter.

At 402, in some embodiments, process 400 can receive a requested first web page that includes a first video identifier.

In some embodiments, the first web page can include any suitable first video identifier. For example, the first video identifier can be a URL associated with a video content item, an alphanumeric code associated with the video content item, metadata associated with a video content item, any other suitable identifier, or any suitable combination thereof.

In some embodiments, the first web page can be requested and/or received using any suitable application. For example, the first web page can be requested and/or received using a web browser, a native video player, a web-based video player, a social media application, an operating system, and advertising application (e.g., an application for selecting advertisements), any other suitable application, or any suitable combination thereof.

At 404, in some embodiments, process 400 can receive a video content item associated with the first video identifier.

In some embodiments, process 400 can receive the video content item using any suitable technique or combination of techniques. For example, process 400 can receive the video content item in response to transmitting a request for the video content item to a URL included in the first web page (e.g., as discussed above in connection with FIG. 2).

At 406, in some embodiments, process 400 can receive area of interest information associated with the video content item.

In some embodiments, process 400 can receive the area of interest information using any suitable technique or combination of techniques. For example, process 400 can receive the information in connection with the first web page (e.g., as discussed above in connection with FIG. 2). As another example, process 400 can transmit a request for the area of interest information to a database of area of interest information (e.g., a database as described above in connection with FIG. 2). As yet another example, in a situation as described above in connection with FIG. 3 where the area of interest information is embedded in the video content item and/or included in the metadata, process 400 can receive the information in connection with the received video content item.

At 408, in some embodiments, process 400 can present the video content item in connection with the first web page based on the area of interest parameters.

In some embodiments, process 400 can present the video content item based on the area of interest information using any suitable technique or combination of techniques. For example, process 400 can use a technique as described above in connection with FIG. 2 and/or FIG. 3.

At 410, in some embodiments, process 400 can request a second web page that includes a second video identifier.

In some embodiments, the second video identifier can be a URL associated with a video content item, an alphanumeric code associated with the video content item, metadata associated with a video content item, any other suitable identifier, or any suitable combination thereof.

At 412, in some embodiments, process 400 can determine that the second video identifier matches the first video identifier using any suitable technique or combination of techniques. For example, process 400 can store the first video identifier and compare the stored first video identifier with the second video identifier upon receiving the second video identifier.

At 414, in some embodiments, in response to determining that the second video identifier matches the first video identifier, process 400 can continue to present the video content item and alter the presentation of the video content item based on the second webpage and the area of interest information.

In some embodiments, process 400 can continue the presentation of the video content item using any suitable technique or combination of techniques. For example, process 400 can render the second web page around the viewport in which the video content item was being presented on the first web page. In such an example, process 400 can then alter the viewport based on information in the second web page (e.g., information indicating a viewport specified by the second web page).

In some embodiments, process 400 can continue the presentation of the video content item without interruption. For example, process 400 can prevent the viewport being used to present the video content item from being interrupted or re-rendered, or reproduced in response to the request for the second web page. As another example, process 400 can prevent an interruption in the communication with a video server (e.g., a video server as described below in connection with FIG. 5) being used to stream the video content item in response to the request for the second web page.

In some embodiments, process 400 can alter the presentation of the video content item based on the area of interest and the second web page using any suitable technique or combination of techniques. For example, process 400 can determine the size of a viewport for presenting the video content item on the second web page (e.g., using a technique as described above in connection with FIG. 2) and alter the presentation of the video content item based on the size of the viewport and the area of interest using a technique as described above in connection with FIGS. 1A, 1B, 1C, 1D, 2, and 3.

In some embodiments, at least some of the above described blocks of the processes of FIG. 2, FIG. 3, and/or FIG. 4 can be executed or performed in any order or sequence not limited to the order and sequence shown in and described in connection with the figures. In some embodiments, the above described blocks of the processes of FIG. 2, FIG. 3, and/or FIG. 4 can be executed by any suitable computer application. For example, the above described blocks of the processes of FIG. 2, FIG. 3, and/or FIG. 4 can be executed by a web browser, a native video player, a web application, an operating system, a social media application, any other suitable computer application, or any suitable combination thereof. Also, some of the above blocks of FIG. 2, FIG. 3, and/or FIG. 4 can be executed or performed substantially simultaneously where appropriate or in parallel to reduce latency and processing times. Additionally or alternatively, in some embodiments, some of the above described blocks of the processes of FIG. 2, FIG. 3, and/or FIG. 4 can be omitted.

Figure 5:
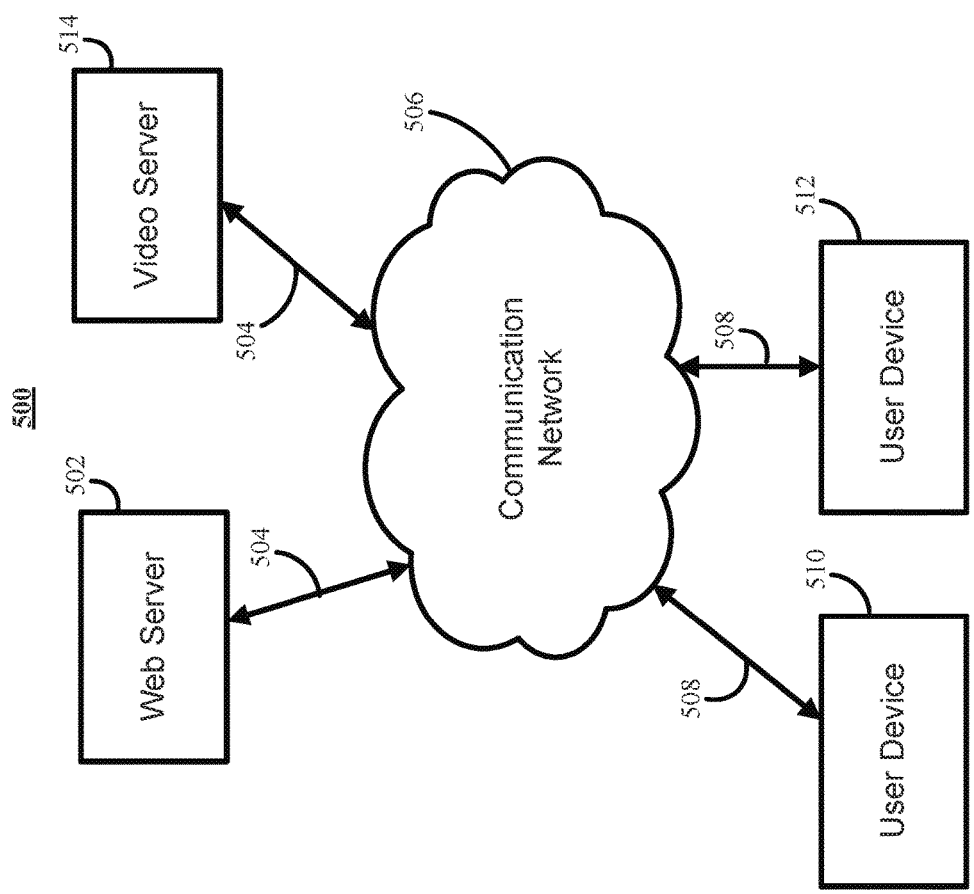
FIG. 5 shows an illustrative example of hardware that can be used in accordance with some embodiments of the disclosed subject matter for adaptive presentation of a video content item based on an area of interest.

FIG. 5 shows an example 500 of hardware that can be used in accordance with some embodiments of the disclosed subject matter for adaptive presentation of a video content item based on an area of interest. As illustrated, hardware 500 can include a web server 502 and a video server 514 connected to a communication network 506 via one or more communication links 504, and/or one or more user devices, such as user devices 510 and 512, connected to communication network 506 via one or more communication links 508.

In some embodiments, web server 502 and/or video server 514 can be any suitable server for storing media content items, delivering the media content items to user devices 510, and/or 512, receiving requests for media content items (e.g., video content items and/or web pages) from user devices 510 and/or 512, storing information related to media content items (e.g., area of interest information as described above), and/or transmitting media content items to user devices 510, and/or 512. For example, web server 502 can be a server that transmits web pages to user devices 510 and/or 512 via communication network 506. As another example, video server 514 can be a server that transmits video content items to user devices 510 and/or 512 via communication network 506. Media content items provided by web server 502 can be any suitable media content, such as video content, audio content, image content, text content, and/or any other suitable type of media content. As a more particular example, media content items can include user-generated content, music videos, television programs, movies, cartoons, sound effects, streaming live content (e.g., a streaming radio show, a live concert, and/or any other suitable type of streaming live content), and/or any other suitable type of media content. Media content items can be created by any suitable entity and/or uploaded to web server 502 by any suitable entity. As another example, video server 502 can be a server that hosts one or more databases (e.g., databases for video metadata, databases for area of interest information, and/or databases for video tags).

Communication network 506 can be any suitable combination of one or more wired and/or wireless networks in some embodiments. For example, communication network 506 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 510, and/or 512 can be connected by one or more communications links 508 to communication network 506 which can be linked via one or more communications links 504 to web server 502 and video server 514. Web server 502 and video server 514 can be linked via one or more communication links 504.

Communications links 504, and/or 508 can be any communications links suitable for communicating data among user devices 510 and 512, web server 502, and video server 514, such as network links, dial-up links, wireless links, hard-wired links, any other suitable communications links, or any suitable combination of such links.

User devices 510, and/or 512 can include any one or more user devices suitable for executing applications (e.g., web browsers, native video players, and/or social media applications), requesting media content items, searching for media content items, presenting media content items, presenting advertisements, receiving input for presenting media content and/or any other suitable functions. For example, in some embodiments, user devices 510, and/or 512 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 510, and/or 512 can be implemented as a non-mobile device such as a desktop computer, a set-top box, a television, a streaming media player, a game console, and/or any other suitable non-mobile device.

Although web server 502 and video server 514 are illustrated as two separate devices, the functions performed by web server 502 and video server 514 can be performed using any suitable number of devices in some embodiments. For example, in some embodiments, the functions performed by web server 502 and video server 514 can be performed on a single server. As another example, in some embodiments, multiple devices can be used to implement the functions performed by web server 502 and video server 514.

Although two user devices 510 and 512 are shown in FIG. 5 to avoid over-complicating the figure, any suitable number of user devices, and/or any suitable types of user devices, can be used in some embodiments.

Figure 6:
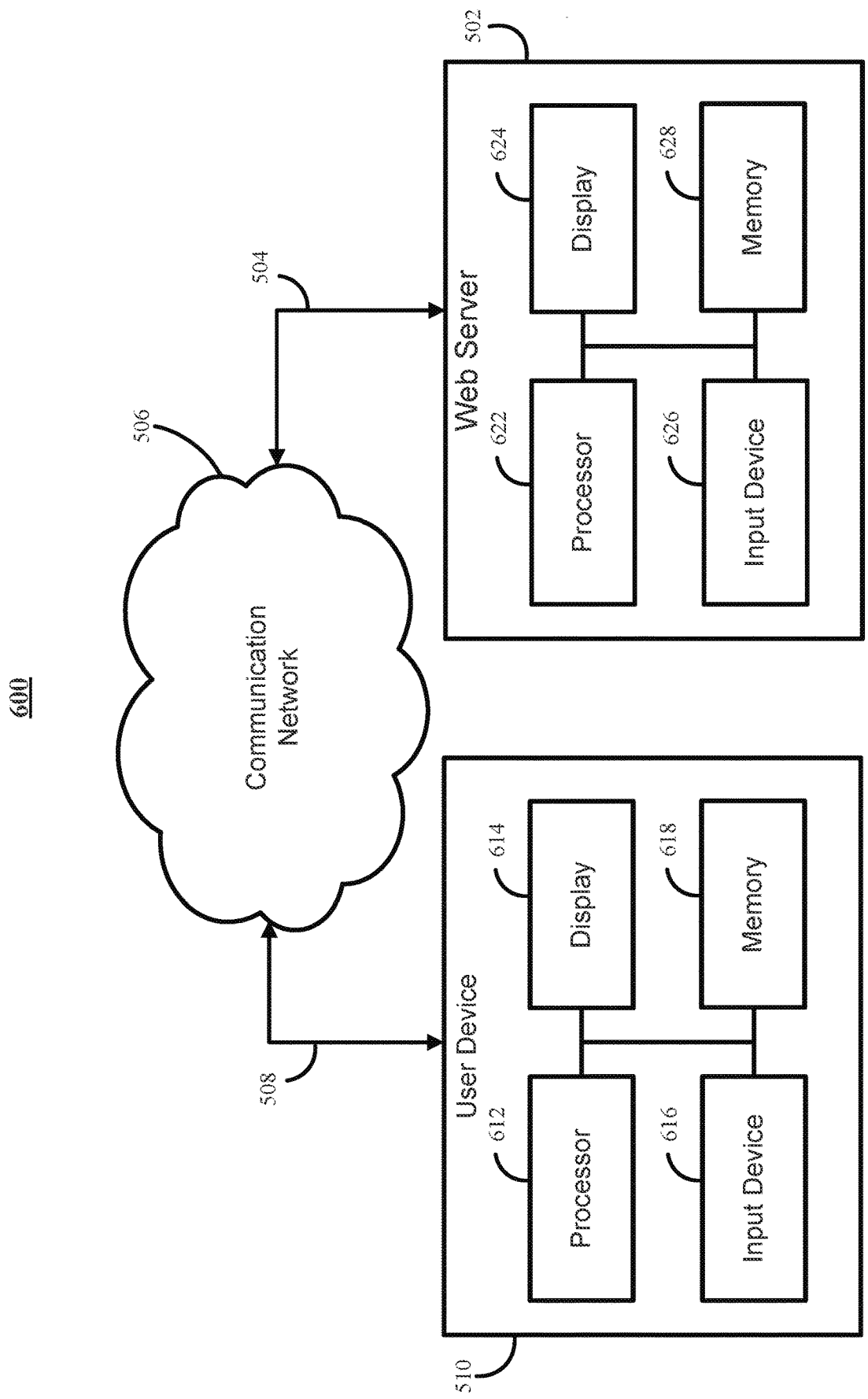
FIG. 6 shows an illustrative example of hardware that can be used in a server and/or a user device of FIG. 5 in accordance with some embodiments of the disclosed subject matter.

Web server 502, video server 514, and user devices 510, and/or 512 can be implemented using any suitable hardware in some embodiments. For example, in some embodiments, devices 502, 510, 512, and/or 514 can be implemented using any suitable general purpose computer or special purpose computer. As another example, a mobile phone may be implemented as a special purpose computer. Any such general purpose computer or special purpose computer can include any suitable hardware. For example, turning to FIG. 6, user device 510 can include a hardware processor 612, a memory and/or storage 618, an input device 616, and a display 614.

Hardware processor 612 can execute the mechanisms described herein for transmitting requests (e.g., for area of interest information as described above and/or for video content items), presenting video content items, determining area of interest information, and/or performing any other suitable functions in accordance with the mechanisms described herein for altering presentation of a video content item based on an area of interest. In some embodiments, hardware processor 612 can send and receive data through communications link 508 or any other communication links using, for example, a transmitter, a receiver, a transmitter/receiver, a transceiver, or any other suitable communication device. In some embodiments, memory and/or storage 618 can include a storage device for storing data received through communications link 508 or through other links. The storage device can further include one or more programs for controlling hardware processor 612. In some embodiments, the one or more programs for controlling hardware processor 612 can cause hardware processor 612 to, for example, execute at least a portion of process 200 described below in connection with FIG. 2, process 300 described below in connection with FIG. 3, and/or process 400 described below in connection with FIG. 4. Display 614 can include a touchscreen, a flat panel display, a cathode ray tube display, a projector, a speaker or speakers, and/or any other suitable display and/or presentation devices. Input device 616 can be a computer keyboard, a computer mouse, a touchpad, a voice recognition circuit, a touchscreen, and/or any other suitable input device. In some embodiments, user device 512 can be implemented using any of the above-described hardware for user device 510.

Web server 502 can include a hardware processor 622, a display 624, an input device 626, and a memory and/or storage 628, which can be interconnected. In some embodiments, memory and/or storage 628 can include a storage device for storing data received through communications link 504 or through other links. The storage device can further include a server program for controlling hardware processor 622. In some embodiments, memory and/or storage 628 can include information stored as a result of user activity (e.g., area of interest information, etc.), and hardware processor 622 can receive requests for such information. In some embodiments, the server program can cause hardware processor 622 to, for example, execute at least a portion of process 200 described below in connection with FIG. 2, process 300 described below in connection with FIG. 3, and/or process 400 described below in connection with FIG. 4.

Hardware processor 622 can use the server program to communicate with user devices 510, and/or 512 as well as provide access to and/or copies of the mechanisms described herein. It should also be noted that data received through communications links 504 and/or 508 or any other communications links can be received from any suitable source. In some embodiments, hardware processor 622 can send and receive data through communications link 504 or any other communication links using, for example, a transmitter, a receiver, a transmitter/receiver, a transceiver, or any other suitable communication device. In some embodiments, hardware processor 622 can receive commands and/or values transmitted by one or more user devices 510 and/or 512, such as a user that makes changes to adjust settings associated with the mechanisms described herein for altering presentation of a video content item based on an area of interest. Display 624 can include a touchscreen, a flat panel display, a cathode ray tube display, a projector, a speaker or speakers, and/or any other suitable display and/or presentation devices. Input device 626 can be a computer keyboard, a computer mouse, a touchpad, a voice recognition circuit, a touchscreen, and/or any other suitable input device.

Any other suitable components can be included in hardware 600 in accordance with some embodiments.

In some embodiments, video server 514 can be implemented using any of the above-described hardware for video server 502.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for altering presentation of a video content item based on an area of interest are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for adaptive presentation of media content, the method comprising:
   receiving a video content item, wherein the video content item is presented within a video viewport having first dimensions;
   determining an area of interest in the video content item;
   generating a plurality of different versions of the video content item for presentation on one or more user devices that each have a device type, wherein each of the plurality of different versions of the video content item include the area of interest in a frame of the video content item;
   selecting a first version of the video content item from a plurality of different versions of the video content item based on second dimensions of the video viewport and based on the device type of a requesting device, and wherein the area of interest is shifted in position within the frame in the first version of the video content item relative to a second version of the video content item; and
   causing the first version of the video content item to be presented within the video viewport on the requesting device.

2. The method of claim 1, wherein the method further comprises determining, in response to a user navigating to view content other than the video content item on a web page, that the first dimensions associated with the video viewport have changed in which the video viewport is currently associated with second dimensions, wherein the first version of the video content item is selected from the plurality of different versions of the video content item based on the second dimensions of the video viewport and based on the device type of the requesting device in response to determining that the first dimensions associated with the video viewport have changed in which the video viewport is currently associated with second dimensions.

3. The method of claim 1, wherein the area of interest corresponds to a face of an entity in the frame of the video content item.

4. The method of claim 1, wherein the area of interest is identified based on parameters specified by a creator of the first version of the video content item and the second version of the video content item.

5. The method of claim 1, wherein the first version of the video content item and the second version of the video content item have different aspect ratios.

6. The method of claim 1, wherein a portion of the frame is included in the first version of the video content item and is not included in the second version of the video content item.

7. The method of claim 1, further comprising:
   receiving information indicating that the dimensions of the video viewport have changed to third dimensions;
   selecting a different version of the video content item from the plurality of different versions of the video content item based on the third dimensions; and
   causing the selected different version of the video content item to be presented on the user device.

8. A system for adaptive presentation of media content, the system comprising: a hardware processor that is configured at least to:
   receive a video content item, wherein the video content item is presented within a video viewport having first dimensions;
   determine an area of interest in the video content item;
   generate a plurality of different versions of the video content item for presentation on one or more user devices that each have a device type, wherein each of the plurality of different versions of the video content item include the area of interest in a frame of the video content item;
   select a first version of the video content item from a plurality of different versions of the video content item based on second dimensions of the video viewport and based on the device type of a requesting device, and wherein the area of interest is shifted in position within the frame in the first version of the video content item relative to a second version of the video content item; and
   cause the first version of the video content item to be presented within the video viewport on the requesting device.

9. The system of claim 8, wherein the hardware processor is further configured to determine, in response to a user navigating to view content other than the video content item on a web page, that the first dimensions associated with the video viewport have changed in which the video viewport is currently associated with second dimensions, wherein the first version of the video content item is selected from the plurality of different versions of the video content item based on the second dimensions of the video viewport and based on the device type of the requesting device in response to determining that the first dimensions associated with the video viewport have changed in which the video viewport is currently associated with second dimensions.

10. The system of claim 8, wherein the area of interest corresponds to a face of an entity in the frame of the video content item.

11. The system of claim 8, wherein the area of interest is identified based on parameters specified by a creator of the first version of the video content item and the second version of the video content item.

12. The system of claim 8, wherein the first version of the video content item and the second version of the video content item have different aspect ratios.

13. The system of claim 8, wherein a portion of the frame is included in the first version of the video content item and is not included in the second version of the video content item.

14. The system of claim 8, wherein the hardware processor is further configured to:
- receive information indicating that the dimensions of the video viewport have changed to third dimensions;
- select a different version of the video content item from the plurality of different versions of the video content item based on the third dimensions; and
- cause the selected different version of the video content item to be presented on the user device.

15. A non-transitory computer-readable medium containing computer executable instructions that, when executed by a processor, cause the processor to perform a method for adaptive presentation of media content, the method comprising:
- receiving a video content item, wherein the video content item is presented within a video viewport having first dimensions;
- determining an area of interest in the video content item;
- generating a plurality of different versions of the video content item for presentation on one or more user devices that each have a device type, wherein each of the plurality of different versions of the video content item include the area of interest in a frame of the video content item;
- selecting a first version of the video content item from a plurality of different versions of the video content item based on second dimensions of the video viewport and based on the device type of a requesting device, and wherein the area of interest is shifted in position within the frame in the first version of the video content item relative to a second version of the video content item; and
- causing the first version of the video content item to be presented within the video viewport on the requesting device.

16. The non-transitory computer-readable medium of claim 15, wherein the method further comprises determining, in response to a user navigating to view content other than the video content item on a web page, that the first dimensions associated with the video viewport have changed in which the video viewport is currently associated with second dimensions, wherein the first version of the video content item is selected from the plurality of different versions of the video content item based on the second dimensions of the video viewport and based on the device type of the requesting device in response to determining that the first dimensions associated with the video viewport have changed in which the video viewport is currently associated with second dimensions.

17. The non-transitory computer-readable medium of claim 15, wherein the area of interest corresponds to a face of an entity in the frame of the video content item.

18. The non-transitory computer-readable medium of claim 15, wherein the area of interest is identified based on parameters specified by a creator of the first version of the video content item and the second version of the video content item.

19. The non-transitory computer-readable medium of claim 15, wherein the first version of the video content item and the second version of the video content item have different aspect ratios.

20. The non-transitory computer-readable medium of claim 15, wherein a portion of the frame is included in the first version of the video content item and is not included in the second version of the video content item.

21. The non-transitory computer-readable medium of claim 15, wherein the method further comprises:
- receiving information indicating that the dimensions of the video viewport have changed to third dimensions;
- selecting a different version of the video content item from the plurality of different versions of the video content item based on the third dimensions; and
- causing the selected different version of the video content item to be presented on the user device.

* * * * *